(12) United States Patent
Drzal (10) Patent No.: US 12,010,950 B2
(45) Date of Patent: Jun. 18, 2024

(54) CAM TRACK ADJUSTMENT ASSEMBLY FOR A HARVESTING REEL

(71) Applicant: CNH Industrial America LLC, New Holland, PA (US)

(72) Inventor: Nathan R. Drzal, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 1101 days.

(21) Appl. No.: 16/647,648

(22) PCT Filed: Sep. 14, 2018

(86) PCT No.: PCT/US2018/051006
§ 371 (c)(1),
(2) Date: Mar. 16, 2020

(87) PCT Pub. No.: WO2019/055743
PCT Pub. Date: Mar. 21, 2019

(65) Prior Publication Data
US 2020/0275609 A1 Sep. 3, 2020

Related U.S. Application Data

(60) Provisional application No. 62/559,303, filed on Sep. 15, 2017.

(51) Int. Cl.
*A01D 57/04* (2006.01)
(52) U.S. Cl.
CPC .................................. *A01D 57/04* (2013.01)
(58) Field of Classification Search
CPC ........................................................ A01D 57/04
See application file for complete search history.

(56) References Cited

U.S. PATENT DOCUMENTS 2,795,920 A * 6/1957 Steuerwald ............ A01D 57/04
403/107
3,472,008 A 10/1969 Hurlburt
(Continued)

FOREIGN PATENT DOCUMENTS

EP 1297735 A1 4/2003
EP 2681984 A1 1/2014

OTHER PUBLICATIONS

International Search Report and Written Opinion for Application No. PCT/US2018/051006 dated Jan. 9, 2019 (12 pages).

*Primary Examiner* — Thomas B Will
*Assistant Examiner* — Julia C Tran
(74) *Attorney, Agent, or Firm* — Peter K. Zacharias; Rebecca L. Henkel; Rickard K. DeMille (57) ABSTRACT

An agricultural harvester includes a header and a cab for an operator of the harvester. The header includes a frame, a support arm connected to the frame and a harvesting reel assembly. The harvesting reel assembly includes a central rotatable shaft connected to the support arm, a reel member extending widthwise across the harvesting reel assembly and connected to the central rotatable shaft for rotation therewith, and a first cam assembly rotatable about a first end of the central rotatable shaft. The first cam assembly includes a first cam plate, a first non-circular cam track for guiding rotation of the reel member and a first adjustor. The first adjustor is operatively engaged with the first cam plate and pivotably connected to the support arm for adjusting a rotational position of the first cam assembly relative to the central rotatable shaft.

19 Claims, 5 Drawing Sheets

(56) References Cited

U.S. PATENT DOCUMENTS

| | | | | |
|---|---|---|---|---|
| 3,546,863 | A | * | 12/1970 | O'D Connolly ....... A01D 57/03 56/226 |
| 3,599,410 | A | * | 8/1971 | de Coene ................ A01D 57/04 56/221 |
| 5,768,870 | A | * | 6/1998 | Talbot .................... A01D 57/03 56/220 |
| 5,987,861 | A | | 11/1999 | Duncan et al. |
| 6,138,447 | A | * | 10/2000 | Stivers ................... A01D 57/02 56/14.4 |
| 6,170,244 | B1 | | 1/2001 | Coers et al. |
| 6,195,972 | B1 | * | 3/2001 | Talbot .................... A01D 89/00 56/220 |
| 6,591,598 | B2 | | 7/2003 | Remillard et al. |
| 6,651,411 | B1 | | 11/2003 | Becker et al. |
| 8,145,378 | B2 | | 3/2012 | Schlingmann et al. |
| 11,044,847 | B2 | * | 6/2021 | Fries .................... A01D 41/141 |
| 2016/0066510 | A1 | | 3/2016 | Cook |
| 2016/0183465 | A1 | * | 6/2016 | Honey ................. A01D 61/002 56/226 |
| 2016/0255773 | A1 | | 9/2016 | Rayfield et al. |
| 2017/0055451 | A1 | | 3/2017 | Jasper |
| 2020/0214208 | A1 | * | 7/2020 | Shearer ................. A01D 57/02 |

\* cited by examiner

CAM TRACK ADJUSTMENT ASSEMBLY FOR A HARVESTING REEL

The present disclosure relates generally to a harvesting reel assembly for a header of a plant cutting machine (e.g., a combine harvester) and, more specifically, to a harvesting reel having a cam track than can be adjusted to change a rotational pitch of the harvesting reel.

BACKGROUND OF THE INVENTION

An agricultural harvester, e.g., a plant cutting machine, such as, but not limited to, a combine or a windrower, generally includes a header operable for severing and collecting plant or crop material as the harvester is driven over a crop field. The header has a plant cutting mechanism for severing the plants or crops, such as an elongate sickle mechanism that reciprocates sidewardly relative to a non-reciprocating guard structure or a row unit with gathering chains and deck plates.

To facilitate the cutting and collection of crop material, the header also includes a harvesting reel assembly. Harvesting reel assemblies, such as a pickup reel, a draper reel and a gathering reel, are used on agricultural harvesters to guide the crop to the cutting mechanism and onto a feeding apparatus. To facilitate collection, the harvesting reel assembly includes a plurality of reel members, i.e., tine bars, extending widthwise across the harvesting reel assembly. Each tine bar includes tines extending outwardly therefrom for engaging crop material as the tines are rotated about a rotational axis. To further facilitate collection, the reel members follow a cam track that guides the position of the tine bars.

To more effectively collect crops, the tines must reach beyond the cutting mechanism to grasp the to-be-cut crop. A non-circular cam track can be effectively used to guide the reel members over varying distances as they are rotated about the rotational axis. Consequently, the rotational position of the non-circular cam track determines how far the tines will extend and how effective the harvesting reel will be at collecting certain crop. However, conventional non-circular cam tracks are limited in that they are fixed in position relative to the header frame.

Therefore, there is still a need for a reel assembly having an easily and/or automatically adjustable cam assembly, and more specifically a cam track, to maximize the efficiency of the reel assembly in response to the height condition of the crop. When the exemplary embodiments are used in combination with an agricultural harvester, the embodiments overcome one more of the disadvantages of conventional headers by providing a non-circular cam track that can be easily rotated to minimize or maximize the reach of attached tine bars as the reel assembly rotates about a rotational axis.

BRIEF SUMMARY OF THE INVENTION

In accordance with an exemplary embodiment, the subject disclosure provides a harvesting reel assembly for an agricultural harvester comprising a central rotatable shaft, a reel member and a first cam assembly. The reel member extends widthwise across the reel assembly and is connected to the central rotatable shaft for rotation therewith. The first cam assembly is connected to and rotatable about a first end of the central rotatable shaft. The first cam assembly includes a first cam plate, a first non-circular cam track and a first adjustor. The first non-circular cam track is mounted to the first cam plate for guiding rotation of the reel member. The first adjustor is operatively engaged with the first cam plate for adjusting a rotational position of the first cam assembly relative to the central rotatable shaft.

An aspect of the exemplary embodiment is that the first cam assembly further includes a fore-aft adjustor and a height adjustor each operatively engaged with the first cam plate for adjusting a position of the first cam assembly relative to the agricultural harvester. The harvesting reel assembly further comprises a second cam assembly connected to and rotatable about a second end of the central rotatable shaft opposite the first end of the central rotatable shaft. The second cam assembly includes a second cam plate, a second non-circular cam track mounted to the second cam plate for guiding rotation of the reel member, and a second adjustor operatively engaged with the second cam plate for adjusting a rotational position of the second cam assembly relative to the central rotatable shaft.

Another aspect of the exemplary embodiment is that the first adjustor is a hydraulic cylinder, an actuator, an electric motor, or a mechanical linkage. The mechanical linkage can be a gear assembly engaged with the central rotatable shaft. The harvesting reel assembly further comprises a locking mechanism for maintaining a rotational position of the first cam assembly.

In accordance with another exemplary embodiment, the subject disclosure provides a header for an agricultural harvester comprising a frame, a support arm and a harvesting reel assembly. The support arm is connected to the frame. The harvesting reel assembly includes a central rotatable shaft, a reel member and a first cam assembly. The central rotatable shaft is connected to the support arm. The reel member extends widthwise across the harvesting reel assembly and is connected to the central rotatable shaft for rotation therewith. The first cam assembly is rotatable about a first end of the central rotatable shaft. The first cam assembly includes a first cam plate, a first non-circular cam track and a first adjustor. The first non-circular cam track guides rotation of the reel member. The first adjustor is operatively engaged with the first cam plate and pivotably connected to the support arm for adjusting a rotational position of the first cam assembly relative to the central rotatable shaft.

An aspect of the exemplary embodiment is that the header further comprises a control unit operatively connected to the first adjustor for remotely adjusting an orientation of the first cam assembly. The header further comprises a height sensor and a fore-aft sensor for monitoring a height position and a fore-aft position, respectively, of the harvesting reel assembly, wherein each of the height sensor and the fore-aft sensor is operatively connected to the control unit. The first adjustor adjusts the rotational position of the first cam assembly in response to a change in the fore-aft position or the height position of the harvesting reel assembly.

Another aspect of the exemplary embodiment is that the harvesting reel assembly is movable between an extended position and a retracted position, and when moved to the extended position, the control unit adjusts the orientation of the first non-circular cam track to increase a distance of the reel member from a forward edge of the header. The first cam assembly further has a fore-aft adjustor and a height adjustor for adjusting a position of the first cam assembly relative to the agricultural harvester, wherein each of the fore-aft adjustor and the height adjustor is operatively engaged with the first cam plate, and wherein the control unit is configured to adjust an orientation of the first cam assembly in response to a change in the position of the first cam assembly. Additionally, the control unit includes computer instructions stored in a memory executable by a processor to adjust the rotational position of the first cam assembly when a translational position of the harvesting reel assembly is adjusted.

In another aspect of the exemplary embodiment the harvesting reel assembly further includes a second cam assembly connected to and rotatable about a second end of the central rotatable shaft opposite the first end of the central rotatable shaft. The second cam assembly includes a second cam plate, a second non-circular cam track mounted to the second cam plate for guiding rotation of the reel member, and a second adjustor operatively engaged with the second cam plate for adjusting a rotational position of the second cam assembly relative to the central rotatable shaft. The harvesting reel assembly further includes a locking mechanism for maintaining a rotational position of the first cam assembly.

In accordance with yet another exemplary embodiment, the subject disclosure provides an agricultural harvester comprising a header and a cab for an operator of the harvester. The header includes a frame, a support arm and a harvesting reel assembly. The support arm is connected to the frame. The harvesting reel assembly includes a central rotatable shaft, a reel member and a first cam assembly. The central rotatable shaft is connected to the support arm. The reel member extends widthwise across the harvesting reel assembly and is connected to the central rotatable shaft for rotation therewith. The first cam assembly is rotatable about a first end of the central rotatable shaft. The first cam assembly includes a first cam plate, a first non-circular cam track and a first adjustor. The first non-circular cam track guides rotation of the reel member. The first adjustor is operatively engaged with the first cam plate and pivotably connected to the support arm for adjusting a rotational position of the first cam assembly relative to the central rotatable shaft.

An aspect of the exemplary embodiment is that the harvester further comprises a control panel operatively connected to the header for operating the first adjustor, a control unit operatively in communication with the control panel and a sensor operatively connected to the control unit for monitoring a position of the harvesting reel assembly, wherein the first adjustor is configured to automatically adjust the rotational position of the first cam assembly in response to a change in the position of the harvesting reel assembly. The control unit includes computer instructions stored in a memory executable by a processor to adjust the rotational position of the first cam assembly when a translational position of the harvesting reel assembly is adjusted.

Another aspect of the exemplary embodiment is that the first adjustor is a hydraulic cylinder, an actuator, an electric motor, or a mechanical linkage, such as, a gear assembly engaged with the central rotatable shaft. The harvesting reel assembly further includes a locking mechanism for maintaining a rotational position of the first cam assembly.

BRIEF DESCRIPTION OF THE SEVERAL VIEWS OF THE DRAWINGS

The foregoing summary, as well as the following detailed description of the exemplary embodiments, will be better understood when read in conjunction with the appended drawings. For purposes of illustration, there are shown in the drawings exemplary embodiments. It should be understood, however, that the exemplary embodiments are not limited to the precise arrangements and instrumentalities shown.

In the drawings.

DETAILED DESCRIPTION OF THE INVENTION

Reference will now be made in detail to the various embodiments illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject disclosure in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject disclosure is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout this disclosure, various aspects of the exemplary embodiments can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments may be combined in any suitable manner in one or more embodiments. One skilled in the relevant art will recognize, in light of the description herein, that the exemplary embodiments can be practiced without one or more of the specific features or advantages of a particular exemplary embodiment. In other instances, additional features and advantages may be recognized in certain embodiments that may not be present in all exemplary embodiments.

Additionally, for convenience purposes only, identical or substantially similar elements of the exemplary embodiments, such as a plurality of reel members 200A, 200B, 200C, 200D may be described with reference to only one of those elements, such as the reel member 200A. It is appreciated therefore that the description of one element is equally applicable to the remainder of the same elements. As such, identical elements, or substantially identical elements where so indicated, will be identified, where appropriate, by the same reference numeral, e.g., 200, and distinguished by an alphabetical letter, e.g., A, B, C, D, etc. For example, the reel member 200A is one of the reel members, the reel member 200B is another of the reel members, the reel member 200C is yet another of the reel members, and so forth.

Referring now to the drawings, FIGS. 1-5 illustrate exemplary embodiments of the subject disclosure. For exemplary purposes only, the agricultural harvester is illustrated as a combine harvester 100. The harvester 100 comprises a header 102 and a cab 104 for an operator of the harvester. The header 102 includes a frame 106, a support arm 108A connected to the frame 106 and a harvesting reel assembly 202.

Figure 1:
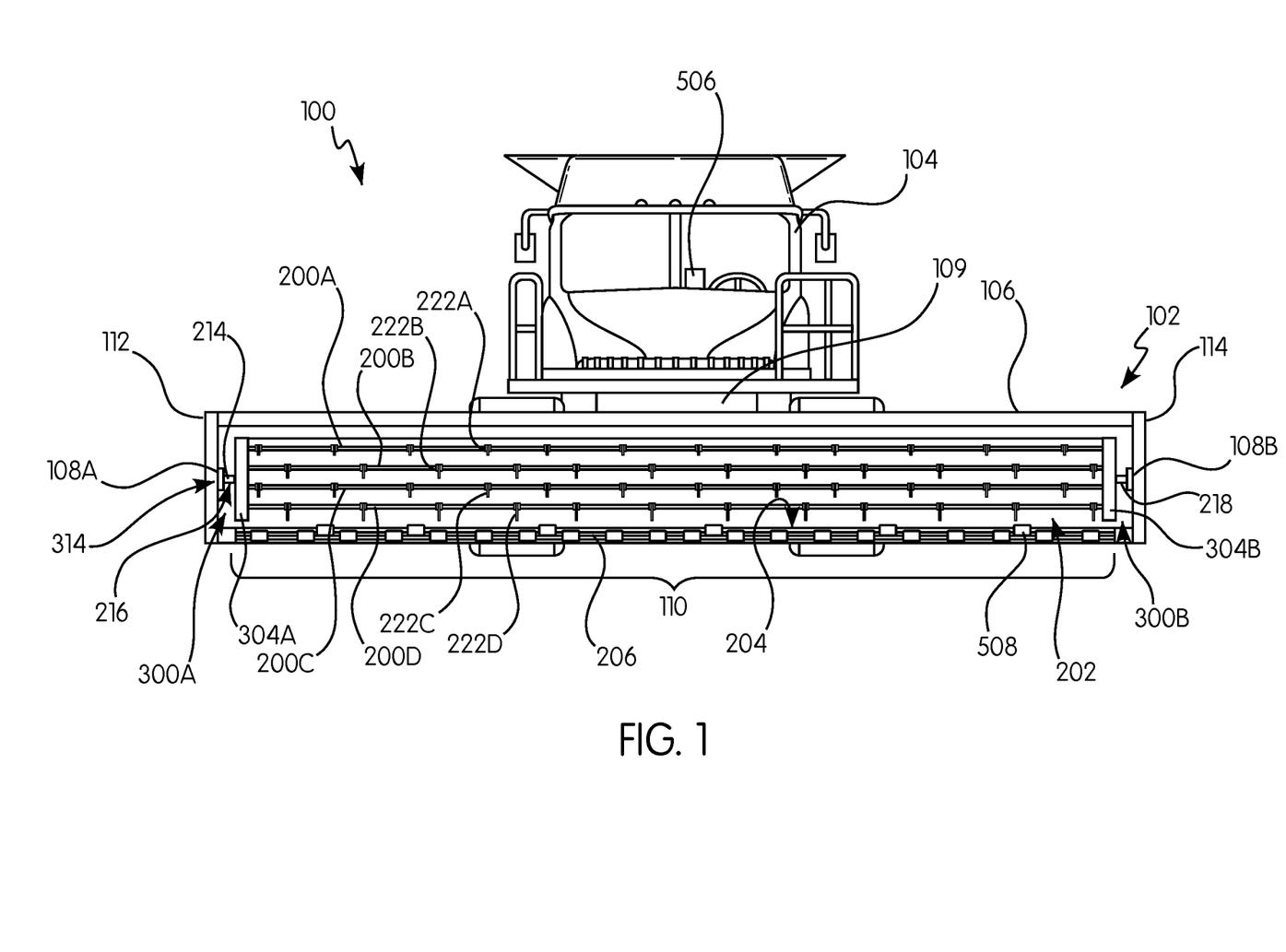
FIG. 1 is a front elevation view of an agricultural harvester including a header in accordance with an exemplary embodiment.
Figure 2:
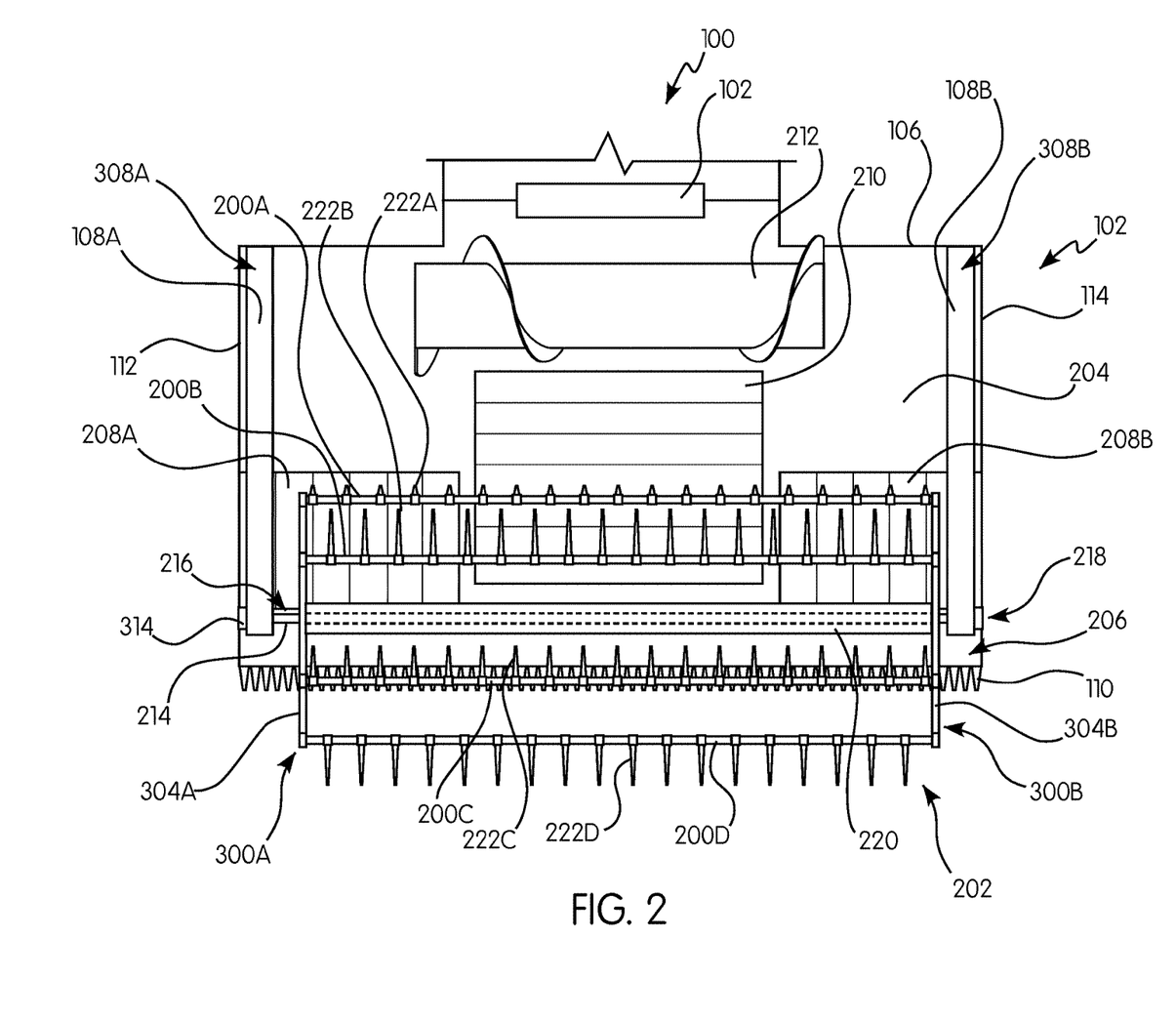
FIG. 2 is a top schematic view of the header of FIG. 1.

Referring now to FIGS. 1 and 2, the frame 106 is the structural chassis of the header 102 and allows for the various components of the header 102 to be attached thereto. The header 102 is attached to a forward end of the harvester 100, and is configured to cut crops, including (without limitation) small grains (e.g., wheat, soybeans, grain, etc.), and to induct the cut crops into a feederhouse 109 as the harvester 100 moves forward over a crop field.

The header 102 includes a floor 204 that is supported in desired proximity to a surface of a crop field and a cutter bar 110. The cutter bar 110 of the header 102 extends transversely along a forward edge 206 of the floor 204, i.e., in a widthwise direction of the harvester 100, and is bound by a first side edge 112 and an opposing second side edge 114, which are both adjacent to the floor 204. The cutter bar 110 is configured to cut crops in preparation for induction into the feederhouse 109. It is appreciated that the cutter bar 110 includes one or more reciprocating sickles such as those disclosed in U.S. Pat. No. 8,151,547, the entire disclosure of which is incorporated herein by reference for all purposes.

The elongated and rotatable harvesting reel assembly 202 extends above and in close proximity to the cutter bar 110. The harvesting reel assembly 202 is configured to cooperate with a plurality of draper belts, such as lateral draper belts 208A, 208B and an infeed draper belt 210 for conveying cut crops to the feederhouse 109. The draper belts 208A, 208B, 210 are configured to convey the cut crops into the harvester 100, and, more specifically, towards the feederhouse 109 for threshing and cleaning. The header 102 may include a rotatable auger 212, e.g., a conveyor screw, to facilitate feeding into the feederhouse 109. While the foregoing aspects of the harvester 100 are being described with respect to the header 102 shown, the harvesting reel assembly 202 of the subject disclosure can be applied to any other header having use for such a reel assembly.

It is appreciated that, for convenience purposes only, the harvesting reel assembly 202 may be described in reference to only one side, e.g., a left side as shown in FIGS. 3A-4B. It is understood that, unless otherwise specified, the right side of the harvesting reel assembly 202 is substantially structurally similar to the left side.

Referring now to FIGS. 1-4B, the harvesting reel assembly 202 is configured substantially as shown. The harvesting reel assembly includes a central rotatable shaft 214 connected to the support arm 108A, a reel member 200A extending widthwise across the harvesting reel assembly 202 and connected to the central rotatable shaft 214 for rotation therewith, and a first cam assembly 300A rotatable about a first end 216 of the central rotatable shaft 214. The first cam assembly 300A includes a first cam plate 302A, a first non-circular cam track 304A for guiding rotation of the reel member 200A, and a first adjustor 306A operatively engaged with the first cam plate 302A and pivotably connected to the support arm 108A for adjusting a rotational position of the first cam assembly 300A relative to the central rotatable shaft 214.

The support arm 108A is configured substantially as shown. The support arm 108A is an elongated member, or series of interconnected members, having a first end 308A and a mounting portion 310A for supporting the harvesting reel assembly 202. The first end 308A is configured to be securable to the frame 106 either rigidly or pivotally e.g., via screws, welding, pins, being integrally formed and so forth. In an exemplary embodiment, the support arm 108A can pivot in a direction substantially normal to the floor 204 of the header 102. Such pivoting motion can be effectuated at the first end 308A or at a joint interconnecting two or more members forming the support arm 108A. It is appreciated that the support arm 108A can be substantially linear or may be curved as necessary for efficient operation. Additionally, the support arm 108A includes a movable section 301A that extends from the support arm 108A. The movable section 301A can be formed from telescoping members or members having complementary shapes and cavities or slots.

The mounting portion 310A is located along a length of the support arm 108A, and more specifically on the movable section 301A of the support arm 108A. The mounting portion 310A is configured to be engaged by the central rotatable shaft 214 via, e.g., a combination of bushings and bearings, such that the central rotatable shaft 214 can rotate within the mounting portion 310A. In an exemplary embodiment, the mounting portion 310A includes an aperture 312A for receiving the central rotatable shaft 214.

The support arm 108A further includes a drive mechanism 314 adjacent to the mounting portion 310A and connectable to the central rotatable shaft 214 for providing rotational motion thereto. The drive mechanism 314 can be a hydraulic motor, a gear train or other such equivalents. Such drive mechanisms 314 are known in the art and do not necessitate extensive discussion for the purposes of the present exemplary embodiments.

Figure 3A:
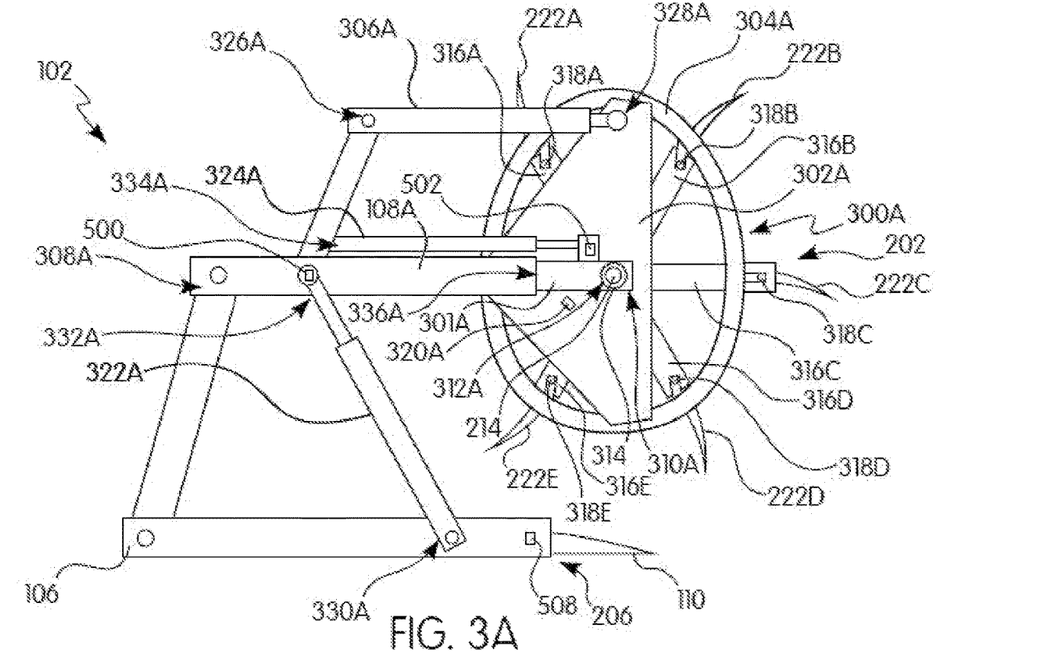
FIG. 3A is a left elevation view of the header of FIG. 1 having a reel assembly in a retracted position in accordance with an aspect of the exemplary embodiment.
Figure 3B:
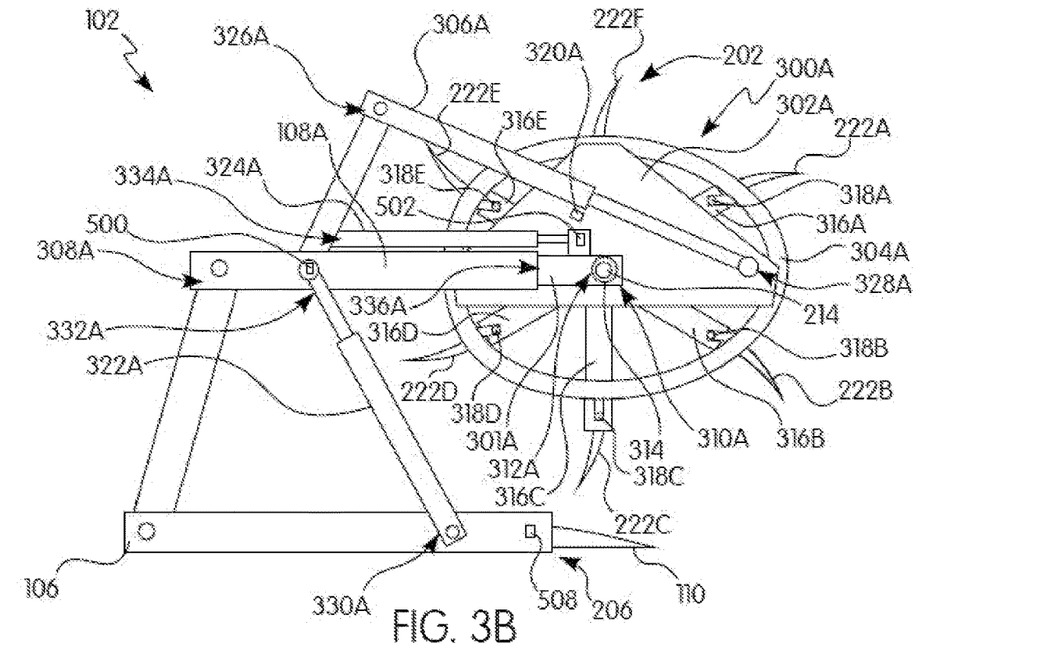
FIG. 3B is a left elevation view of the header of FIG. 1 having a reel assembly in an extended position via rotation of a cam track in accordance with an aspect of the exemplary embodiment.
Figure 4A:
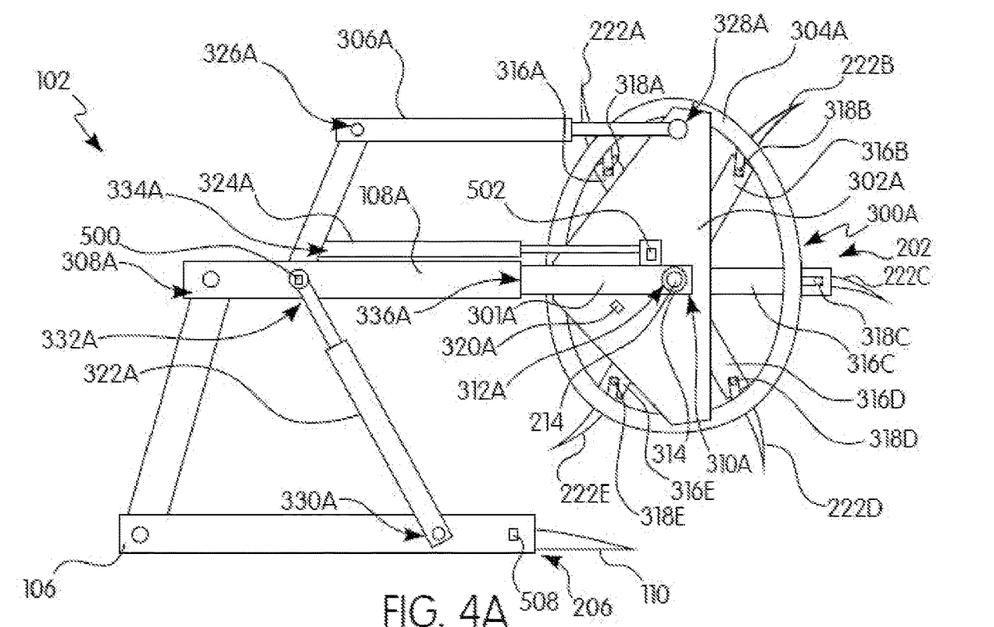
FIG. 4A is a left side elevation view of the header of FIG. 1 having a reel assembly in an extended position via fore-aft translation in accordance with an aspect of the exemplary embodiment.
Figure 4B:
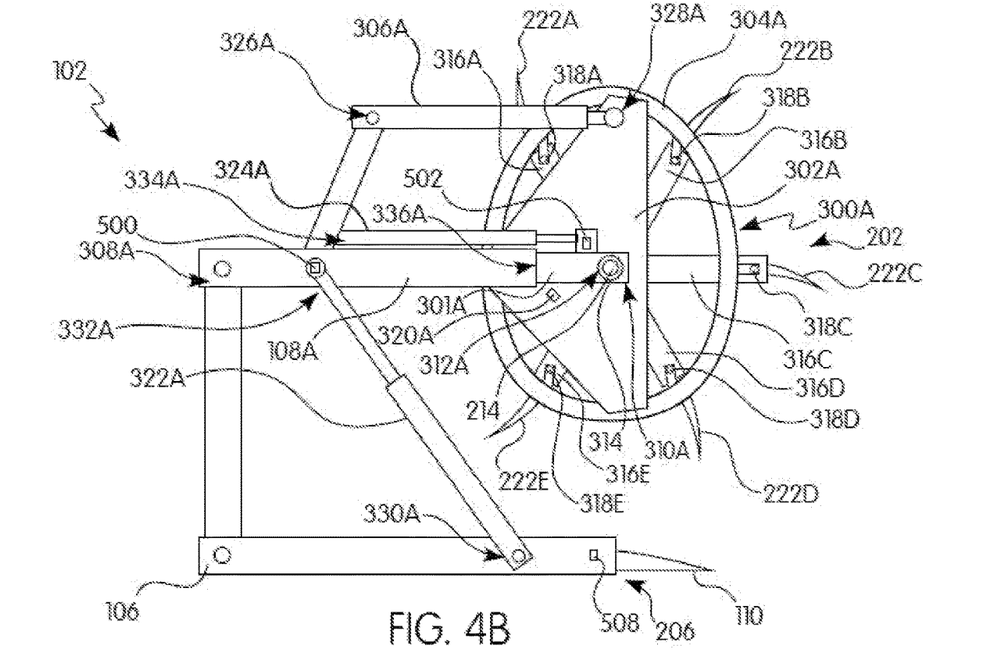
FIG. 4B is a left side elevation view of the header of FIG. 1 having a reel assembly in a raised position via a height/vertical translation in accordance with an aspect of the exemplary embodiment.

Referring now to FIGS. 2-3B, the central rotatable shaft 214 is configured substantially as shown. In an exemplary embodiment, the central rotatable shaft 214 is a substantially cylindrical elongated rotatable member. It is appreciated that the central rotatable shaft 214 can take any other longitudinal cross sectional shapes such as squares, ovals, and so forth. The central rotatable shaft 214 includes the first end 216 which is configured to engage the drive mechanism 314 and the mounting portion 310A of the support arm 108A, and a second end 218 opposite the first end 216 configured to be rotatably connectable to a mounting portion 310B of another support arm 108B. The central rotatable shaft 214 may further include an outer portion 220 circumscribing a portion of the central rotatable shaft 214 configured to support and transmit rotational motion to, e.g., a reel arm 316A extending therefrom.

Referring now to FIGS. 3A-4B, the reel arm 316A is configured substantially as shown. The reel arm 316A is an elongated member extending from the outer portion 220 of the rotatable shaft 214 and connectable to the first non-circular cam track 304A for rotation therewith. In an exemplary embodiment, the reel arm 316A is connectable to the first non-circular cam track 304A via a slidable link 318A. The slidable link 318A includes an end pivotably connected to the reel arm 316A and an opposite end slidably connectable to the first non-circular cam track 304A. Such reel arms 316A are disclosed in, e.g., U.S. Patent Application Publication No. 2016/0255773 and U.S. Pat. No. 6,170,244, the entire disclosures of which are incorporated herein by reference for all purposes. It is appreciated however that the reel arm 316A can be configured to adjustably attach to the first non-circular cam track 304A in other ways known in the art.

Referring now to FIGS. 1-4B, the reel member 200A, e.g., a tine bar or bat, is configured substantially as shown. The reel member 200A is an elongated member having a length extending widthwise across the harvesting reel assembly 202. At an end of the reel member 200A, the reel member is connectable to the reel arm 316A for rotation therewith. Such connection can be achieved by way of, e.g., screws, welding, apertures, nuts, pins and so forth. In other words, the reel member 200A is configured to rotate about the central rotatable shaft 214 by way of its connection to the reel arm 316A. In an exemplary embodiment, the reel member 200A is pivotably connected to the extendable reel arm 316A for pivoting therein and adjusting the pitch of the plurality of tines 222A.

Extending from the reel member 200A at a plurality of positions along a length of the reel member 200A are the plurality of tines (e.g., 222A-F) configured substantially as shown in FIGS. 1-4B. The tines are curved elongated members having an arched or a curvilinear configuration for grasping crop material. In an exemplary embodiment, the tines are pivotably connected to the reel member 200A for pivoting thereabout. Alternatively, the tines can be configured to rigidly connect to the reel members 200A via, e.g., welding, screws, complementary shaped slots, rivets, force fit, being integrally formed and so forth.

It is appreciated that any number of reel arms, reel members and tines may be used. Thus, the subject disclosure is not limited to the number depicted in the drawings.

Referring now to FIGS. 3A-4B, the first cam plate 302A is configured substantially as shown. The first cam plate 302A is a substantially planar plate covering a lateral side of the harvesting reel assembly 202 which serves as a structural framework for the first non-circular cam track 304A to attach thereto. The first cam plate 302A is configured to receive the central rotatable shaft 214. The first cam plate 302A may also include appropriate apertures and/or bearings for facilitating the passage and operation of the central rotatable shaft 214 with the mounting portion 310A of the support arm 108A.

Referring now to FIGS. 1-4B, the first non-circular cam track 304A is configured substantially as shown. The first non-circular cam track 304A forms a guide, i.e., a path, for the reel arm 318A, and more specifically the slidable link 318A, to follow as the central rotatable shaft 214 is rotated. By extension, the first non-circular cam track 304A additionally defines a sweep path for the reel member 200A, which is connectable to the reel arm 316A, and the plurality of tines, which are connectable to the reel member 200A. In an exemplary embodiment, the first non-circular cam track 304A is a non-circular, e.g., oval, member or series of members defining a non-circular ring, i.e., circumference, configured to be engaged by the slidable link 318A. It is appreciated that the first non-circular cam track 304A can take any shape as desired such as a bean shape or otherwise be generally arcuate in shape. In an exemplary embodiment, however, the first non-circular cam track 304A is irregularly shaped such that, if rotated about the central rotatable shaft 214, the first non-circular cam track's 304A radius relative to the floor 204 of the header 102 varies about its circumference. In other words, the first non-circular cam track 304A, when rotated, can extend far beyond the forward edge 206 of the header 102 on which the attached reel member 200A travels as it moves along its sweep path, as shown by comparison in FIGS. 3A and 3B.

As such, both the first cam plate 302A and the first non-circular cam track 304A are configured to be rotatable about the central rotatable shaft 214, i.e., between a first position and a second position. Such a rotatable connection can be accomplished via bushings and bearings between the first cam plate 302A and the central rotatable shaft 214 which extends therethough. Additionally, to limit and/or hold the first cam plate 302A and first non-circular cam track 304A in a specific rotatable position, the first cam plate 302A and/or first non-circular cam track 304A may also including a locking mechanism 320A for maintaining a rotational position of the first cam assembly 300A, and more specifically of the first non-circular cam track 304A. The locking mechanism 320A may be a member extending from the cam plate 302A that is configured to lockably secure to, e.g., the first adjuster 306A, or any other mechanism as is known in the art, such as a rack and pinion lock.

It is appreciated that the first cam plate 302A and the first non-circular cam track 304A can be integrally formed. Alternatively, it is also appreciated that the first non-circular cam track 304A can be constructed such that it does not require a first cam plate 302A. For example, the first non-circular cam track 304A can be supported solely by the reel arm 316A by being connected to the central rotatable shaft 214 via, e.g., spider arms or other elongated members connected thereto.

Referring now to FIGS. 3A-5, to facilitate adjusting a translational and rotational position of the first non-circular cam track 304A, the cam assembly 300A includes the first adjustor 306A for adjusting the rotational orientation of the first non-circular cam track 304A, and a height adjustor 322A and a fore-aft adjustor 324A for adjusting a translation position of the harvesting reel assembly 202 in a lifting direction and a fore-aft direction, respectively.

The adjustors 306A, 322A, 324A are configured substantially as shown in FIGS. 3A-4B. In an exemplary embodiment, the first adjustor 306A has a first end 326A pivotably connectable to the support arm 108A via, e.g., pins, and a second end 328A connectable to the first cam plate 302A or the first non-circular cam track 304A such that, when actuated, the first non-circular cam track 304A is rotated about the central rotatable shaft 214. Specifically, the second end 328A is positioned off center on the first cam plate 302A and is extendable in a direction that facilitates rotation about the central rotatable shaft 214. In an exemplary embodiment, the first adjustor 306A is configured to rotate the first non-circular cam track 304A up to about 15°, however it is appreciated it can be as little as about 1° to as much as about 90°, including 5°, 10°, 15°, 20°, 25°, 30°, 35°, 40°, 45°, 50°, 55°, 60°, 65°, 70°, 75°, 80°, 85°, and 90°.

The height adjustor 322A has a first end 330A connectable to the frame 106 and a second end 332A connectable to the support arm 108A such that, when actuated, the support arm 108A pivots either at the first end 308A of the support arm 108A or at a joint member forming the support arm 108A for lifting or lowering the harvesting reel assembly 202 away or towards the floor 204 of the header 102, respectively. The fore-aft adjustor 324A has a first end 334A connectable to the support arm 108A and a second end 336A extending in a direction substantially parallel to the support arm 108A and connectable to the movable section 301A of the support arm 108A such that, when actuated, the movable section 301A can be moved to elongate the support arm 108A.

It is appreciated that the first adjustor 306A can be connected to the fore-aft adjustor 324A or otherwise configured to operate in concert with the fore-aft adjustor 324A. It is also appreciated that the adjustors 306A, 322A, 324A can be configured to serve as the locking mechanisms for maintaining the harvesting reel assembly 202 in a specific rotational position without the need for, or in addition to, the locking mechanism 320A.

In other words, the first cam assembly further includes a fore-aft adjustor and a height adjustor each operatively engaged with the first cam plate for adjusting a position, e.g., translational position, of the first cam assembly relative to the agricultural harvester.

In an exemplary embodiment, the adjustors 306A, 322A, 324A are hydraulic cylinders. However, it is appreciated that the adjustors 306A, 322A, 324A can be actuators, electric motors, mechanical linkages, and so forth as is known in the art. The mechanical linkage can include interlocking gears rotatably attached to the central rotatable shaft 214 and the first non-circular cam track 304A. For example, the first adjustor 306A is a hydraulic cylinder, an actuator, an electric motor, or a mechanical linkage such as a gear assembly engaged with the central rotatable shaft.

Referring now to FIGS. 1 and 3A-5, the agricultural harvester 100 can also include a series of sensors, such as a height sensor 500 and a fore-aft sensor 502, a control unit 504, and a control panel 506. The sensors 500, 502 are configured to monitor and communicate the translational position of the harvesting reel assembly 202 to the control unit 504. As such, in an exemplary embodiment, the sensors 500, 502 are located adjacent to or otherwise in communication with the height adjustor 322A and fore-aft adjustor 324A, respectively.

Figure 5:
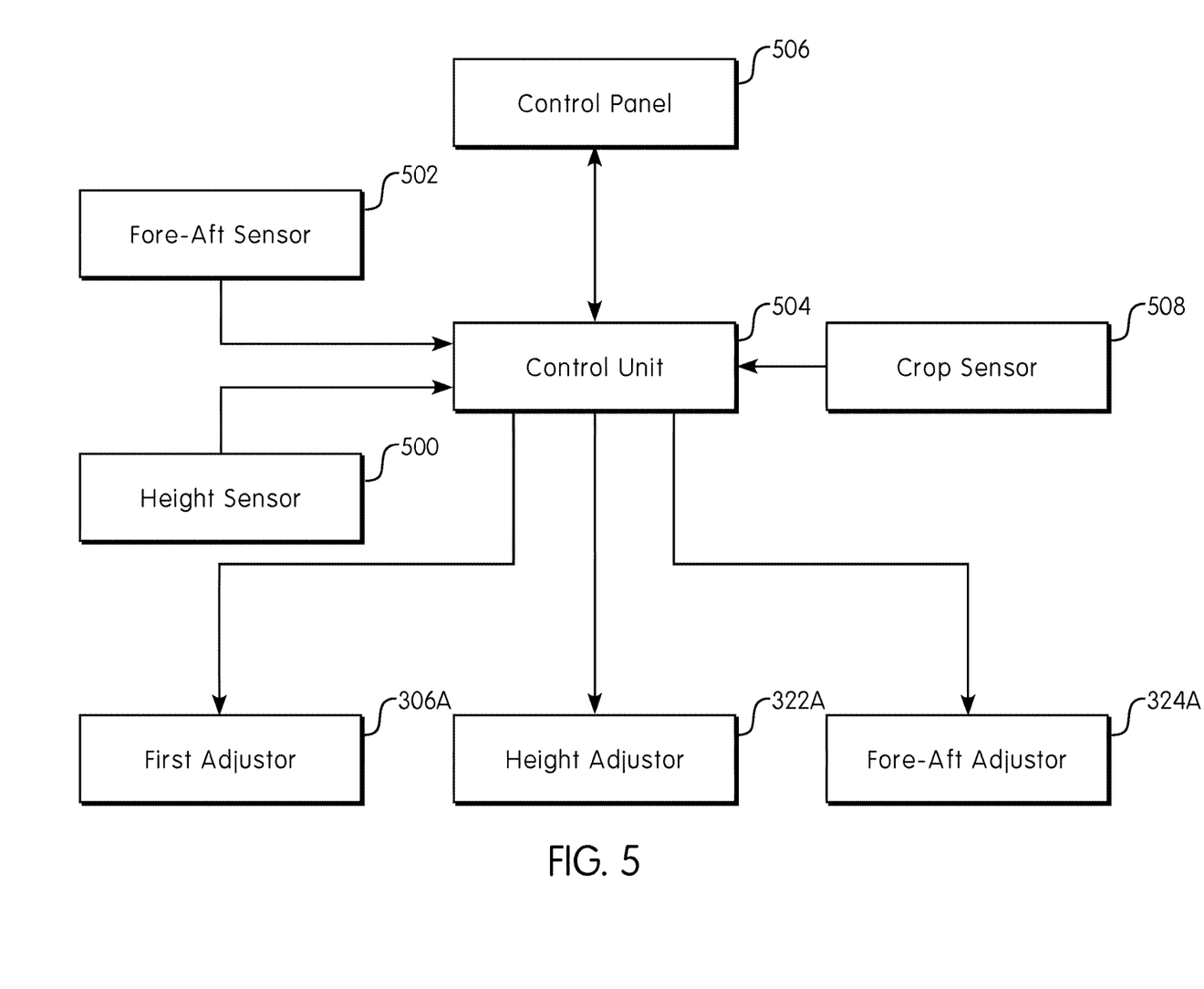
FIG. 5 is a schematic diagram in accordance with an aspect of the exemplary embodiment of the subject disclosure of a control unit associated with the header.

Furthermore, the control unit 504 is configured to control the operation of the adjustors 306A, 322A, 324A in order to change the rotational and translational position of the harvesting reel assembly 202. The control unit 504 can be configured to be manually controlled to operate the adjustors 306A, 322A, 324A via the control panel 506. Alternatively, or in addition, the control unit 504 may be configured to automatically operate the adjustors 306A, 322A, 324A based on pre-configured settings via a series of executable computer instructions stored in a computer memory by a processor in communication with the control unit. For example, the control unit 504 may be programmed to actuate the first actuator 306A a certain degree to orient the first non-circular cam track 304A into an "optimum orientation" based on the translational position of the harvesting reel assembly 202. In other words, the control unit includes computer instructions stored in a computer memory executable by a processor to adjust the rotational position of the first cam assembly when a translational position of the harvesting reel assembly is adjusted.

Additionally, the header 102 can further include a crop sensor 508. The crop sensor 508 is configured to monitor the height of the crops in the crop field as the header 102 moves across the crop field. The crop sensor 508 is operatively in communication with the control unit 504 and communicates the height of the crops in order to cause the control unit 504 to automatically adjust the adjustors 306A, 322A, 324A into an optimized orientation of the harvesting reel assembly 202. It is appreciated that the sensors 500, 502, 508 can be located on various parts of the header 102.

In other words, the header further comprises a control unit operatively connected to the first adjustor for remotely adjusting an orientation of the first cam assembly. The header further comprises a height sensor and a fore-aft sensor for monitoring a height position and a fore-aft position of the harvesting reel assembly, wherein each of the height and the fore-aft sensor is operatively connected to and in communication with the control unit. The first adjustor adjusts the rotational position of the first cam assembly in response to a change in the fore-aft position or the height position of the harvesting reel assembly.

Referring now to FIGS. 1-5, the header 102 is operatively connected to the harvester 100. The harvesting reel assembly 202 extends widthwise across the header 102 above the forward edge 206 and is supported by the support arms 108A, 108B. The support arms 108A, 108B extend forwardly from the frame 106 at their first end 308A, 308B and are adjacent to the first and second side edges 112, 114 respectively. The central rotatable shaft 214 extends widthwise across the header 102 and is rotatably connected to the mounting portions 310A, 310B on the movable sections 301A, 301B of the support arms 108A, 108B. The central rotatable shaft 214 is also connected to the drive mechanism 314 for rotation therewith.

The reel arms 316A-F extend outwardly from the outer portion 220 of the central rotational shaft 214. The reel arms 316A-F are connected to the first non-circular cam track 304A via the slidable link 318A such that the slidable link tracks the first non-circular cam track 304A as the central rotatable shaft 214 is rotated. The reel members 200A-F are connected to the respective reel arms 316A-F for rotation therewith. It is appreciated that a similar arrangement of reel arms and slidable links are connected to the central rotatable shaft 214 and the cam track 304B on the opposite side of the harvesting reel assembly 202.

The control panel 506 can be operatively secured in the cab 104 of the harvester 100 and is in operative communication with the control unit 504 for operating the adjustors 306A, 322A, 324A. The control unit 504 is also in communication with the height sensor 500 and the fore-aft sensor 502 for monitoring the translational position of the harvesting reel assembly 202. The control unit 504 is further in communication with the crop sensor 508 for monitoring the height of the to-be-cut crop. The first adjustor 306A is rigidly secured to the first cam plate 302A and pivotably connected to the support arm 108A. The height adjustor 322A is operatively connected to the support arm 108A and the floor 204 of the header 102. The fore-aft adjustor 324A is operatively connected to the movable section 301A of the support arm 108A and to the remainder of the support arm 108A for adjusting the length of the support arm 108A. It is appreciated that, in an exemplary embodiment, a similar arrangement of adjustors and sensors on the opposite side of the harvesting reel assembly 202 are operatively connected to the control unit 504.

An exemplary embodiment of the subject disclosure operates by having the first non-circular cam track 304A be rotatable about the central rotatable shaft 214 via the first adjustor 306A, either manually or automatically, through the control unit 504 and the control panel 506. Specifically, as the harvester 100 moves over the crop field, the operator of the harvester can rotate the first non-circular cam track 304A about the central rotatable shaft 214 to maximize or minimize the reach of the tines using the control panel 506. For example, if the crop is low to the ground, the operator can rotate the first non-circular cam track 304A with the first adjustor 306A, lower the height of the harvesting reel assembly 202 with the height adjustor 322A, and/or forwardly extend the harvesting reel assembly 202 with the fore-aft adjustor 324A in order to maximize the reach of the tines.

In other words, the agricultural harvester comprises a control panel operatively connected to the header for operating the first adjustor. The header further includes a control unit operatively in communication with the control panel and sensor operatively connected to the control unit for monitoring a position of the harvesting reel assembly, wherein the first adjustor is configured to automatically adjust the rotational position of the first cam assembly in response to a change in the position of the harvesting reel assembly.

Additionally, the control unit 504 can be programmed to include "optimum positional settings" that the operator can access using the control panel 506. These can be programmed positions that the height adjustor 322A, the fore-aft adjustor 324A and the first adjustor 306A can be actuated to create a specific cam and/or sweep path. The height sensor 500 and the fore-aft sensor 502 can monitor the translational position of the harvesting reel assembly 202 to maintain the harvesting reel assembly in an "optimum" crop gather orientation. For example, if the fore-aft adjustor 324A is engaged to translate the harvesting reel assembly in the fore-direction, then the cam track 304A can be automatically rotated to shorten/lessen the distance the tines can reach with respect to the harvesting reel assembly.

Furthermore, the crop sensor 508 is utilized to monitor the height of the crop as the harvester travels over a crop field. For example, if the crop is sensed to be low, the control unit 504 can automatically activate the adjustors 306A, 322A, 324A to maximize the reach of the tines.

In other words, the harvesting reel assembly is movable between an extended position and a retracted position, and, when moved to the extended position, the control unit is configured to adjust the orientation of the first non-circular cam track to increase a distance of the reel member from a forward edge of the header. The first cam assembly further has a fore-aft adjustor and a height adjustor for adjusting a position of the first cam assembly relative to the agricultural harvester, wherein each of the fore-aft adjustor and the height adjustor is operatively engaged with the first cam plate, and wherein the control unit is configured to adjust an orientation of the first cam assembly in response to a change in the position, e.g., translational position, of the first cam assembly.

It is appreciated that although the above disclosure may have been addressed to only one side of the harvesting reel assembly 202, e.g., the left side as shown in FIGS. 3A-4B, the teachings above are equally applicable to the opposite, e.g., right, side of the harvesting reel assembly 202. It is, however, also appreciated that the right side does not need to be identical. For example, the right side cam assembly, i.e., a second cam assembly 300B, may be configured to mimic the first cam assembly 300A rather than be independently controllable by the control panel 506. In other words, the first cam assembly 300A could be a "master cam" and the second cam assembly 300B could be a "slave cam" that follows the same rotational and translational position as the "master cam."

In other words, the harvesting reel assembly further comprises a second cam assembly connected to and rotatable about a second end of the central rotatable shaft opposite the first end of the central rotatable shaft, the second cam assembly including a second cam plate, a second non-circular cam track mounted to the second cam plate for guiding rotation of the reel member, and a second adjustor operatively engaged with the second cam plate for adjusting a rotational position of the second cam assembly relative to the central rotatable shaft.

The advantages of a header having a cam assembly that has an automatically and/or actively rotatable cam track are apparent. Specifically, crop field harvesting efficiency can be significantly increased if the operator of the harvester does not need to shut down the harvester in order to manually alter the cam track orientation to match the type of crop that is currently being collected. The exemplary embodiments allow the operator to quickly and efficiently adjust the reach of the tines without needing to stop the operation of the harvester. Therefore, significant time and effort can be saved.

While the subject disclosure has been described with reference to exemplary embodiments, it will be appreciated by those skilled in the art that various changes may be made and equivalents may be substituted for elements thereof without departing from the scope of the subject disclosure. For example, features described in one embodiment may be incorporated into a different embodiment, such as the use of different types of sensors.

In addition, modifications may be made to adapt a particular situation or material to the teachings of the subject disclosure without departing from the essential scope thereof. For example, the header can include a split reel rather than a single reel, the header may use different support arms for supporting the harvesting reel assembly, the harvesting reel assembly may have a different number of support members and/or reel arms, and so forth. It is to be understood, therefore, that the subject disclosure not be limited to the particular aspects disclosed, but it is intended to cover modifications within the spirit and scope of the subject disclosure as defined by the appended claims and discussed above.

I claim:

1. A harvesting reel assembly for an agricultural harvester comprising:
   a central rotatable shaft;
   a reel member extending widthwise across the reel assembly and connected to the central rotatable shaft for rotation therewith; and a first cam assembly connected to and rotatable about a first end of the central rotatable shaft, the first cam assembly including:
a first cam plate,
a first non-circular cam track mounted to the first cam plate for guiding rotation of the reel member, and
a first adjustor operatively engaged with the first cam plate for adjusting a rotational position of the first cam assembly relative to the central rotatable shaft in response to a control signal provided by a control unit in response to a sensor signal indicating a position of the harvesting reel assembly.

2. The harvesting reel assembly of claim 1, wherein the first cam assembly further includes a fore-aft adjustor and a height adjustor each operatively engaged with the first cam plate for adjusting a position of the first cam assembly relative to the agricultural harvester.

3. The harvesting reel assembly of claim 1, further comprising a second cam assembly connected to and rotatable about a second end of the central rotatable shaft opposite the first end of the central rotatable shaft, the second cam assembly including:
a second cam plate,
a second non-circular cam track mounted to the second cam plate for guiding rotation of the reel member, and
a second adjustor operatively engaged with the second cam plate for adjusting a rotational position of the second cam assembly relative to the central rotatable shaft.

4. The harvesting reel assembly of claim 1, wherein the first adjustor is a hydraulic cylinder, an actuator, an electric motor, or a mechanical linkage.

5. The harvesting reel assembly of claim 4, wherein the mechanical linkage is a gear assembly engaged with the central rotatable shaft.

6. The harvesting reel assembly of claim 1, further comprising a locking mechanism for maintaining a rotational position of the first cam assembly.

7. A header for an agricultural harvester, comprising:
a frame;
a support arm connected to the frame;
a harvesting reel assembly that includes:
a central rotatable shaft connected to the support arm,
a reel member extending widthwise across the harvesting reel assembly and connected to the central rotatable shaft for rotation therewith, and
a first cam assembly rotatable about a first end the central rotatable shaft, the first cam assembly having:
a first cam plate,
a first non-circular cam track for guiding rotation of the reel member, and
a first adjustor operatively engaged with the first cam plate and pivotably connected to the support arm for adjusting a rotational position of the first cam assembly relative to the central rotatable shaft:
a control unit operatively in communication with the first adjustor; and
a sensor operatively connected to the control unit, the sensor configured for outputting a signal indicating a position of the harvesting reel assembly,
wherein the control unit is configured to control the first adjustor to adjust the rotational position of the first cam assembly in response to the signal output by the sensor.

8. The header of claim 7, wherein the sensor comprises a height sensor for monitoring a height position and a fore-aft sensor for monitoring a fore-aft position of the harvesting reel assembly, wherein each of the height sensor and the fore-after sensor is operatively connected to the control unit.

9. The header of claim 8, wherein the control unit is configured to control the first adjustor to adjust the rotational position of the first cam assembly in response to a change in the fore-aft position or the height position of the harvesting reel assembly.

10. The header of claim 7, wherein the harvesting reel assembly is moveable between an extended position and a retracted position, and when moved to the extended position, the control unit adjusts the orientation of the first non-circular cam track to increase a distance of the reel member from a forward edge of the header.

11. The header of claim 7, wherein the first cam assembly further includes a fore-aft adjustor and a height adjustor for adjusting a position of the first cam assembly relative to the agricultural harvester, wherein each of the fore-aft adjustor and the height adjustor is operatively engaged with the first cam plate, and wherein the control unit is configured to adjust an orientation of the first cam assembly in response to a change in the position of the first cam assembly.

12. The header of claim 7, wherein the control unit includes computer instructions stored in a memory executable by a processor to adjust the rotational position of the first cam assembly when a translational position of the harvesting reel assembly is adjusted.

13. The header of claim 7, wherein the harvesting reel assembly further includes a second cam assembly connected to and rotatable about a second end of the central rotatable shaft opposite the first end of the central rotatable shaft, the second cam assembly including:
a second cam plate,
a second non-circular cam track mounted to the second cam plate for guiding rotation of the reel member, and
a second adjustor operatively engaged with the second cam plate for adjusting a rotational position of the second cam assembly relative to the central rotatable shaft.

14. The header of claim 7, wherein the harvesting reel assembly further includes a locking mechanism for maintaining a rotational position of the first cam assembly.

15. An agricultural harvester comprising:
a header that includes:
a frame,
a support arm connected to the frame,
a harvesting reel assembly having:
a central rotatable shaft connected to the support arm,
a reel member extending widthwise across the harvesting reel assembly and connected to the central rotatable shaft for rotation therewith, and
a first cam assembly rotatable about a first end of the central rotatable shaft, the first cam assembly having:
a first cam plate,
a first non-circular cam track for guiding rotation of the reel member, and
a first adjustor operatively engaged with the first cam plate and pivotably connected to the support arm for adjusting a rotational position of the first cam assembly relative to the central rotatable shaft;
a control unit operatively in communication with the first adjustor; and
a sensor operatively connected to the control unit, the sensor configured for outputting a signal indicating a position of the harvesting reel assembly, wherein the control unit is configured to control the first adjustor to adjust the rotational position of the first cam assembly in response to the signal output by the sensor; and a cab for an operator of the harvester.

16. The agricultural harvester of claim 15, further comprising:

a control panel operatively connected to the header for operating the first adjustor, wherein the control unit is operatively in communication with the control panel.

17. The agricultural harvester of claim 16, wherein the control unit includes computer instructions stored in a memory executable by a processor to adjust the rotational position of the first cam assembly when a translational position of the harvesting reel assembly is adjusted.

18. The agricultural harvester of claim 15, wherein the first adjustor is a hydraulic cylinder, an actuator, an electric motor, or a gear assembly engaged with the central rotatable shaft.

19. The agricultural harvester of claim 15, wherein the harvesting reel assembly further includes a locking mechanism for maintaining a rotational position of the first cam assembly.

* * * * *